United States Patent
Piriläet al.

(10) Patent No.: US 6,950,516 B2
(45) Date of Patent: Sep. 27, 2005

(54) USER CHANGEABLE ELECTRONIC DEVICE/MOBILE PHONE COVERS AND METHOD

(75) Inventors: Jouko Pirilä, Turku (FI); Mikko Laaksonen, Angelniemi (FI); Mikko Laitinen, Halikko (FI); Jarmo Lehtonen, Littoinen (FI)

(73) Assignee: Nokia Corporation, Espoo (FI)

( * ) Notice: Subject to any disclaimer, the term of this patent is extended or adjusted under 35 U.S.C. 154(b) by 507 days.

(21) Appl. No.: 10/108,858

(22) Filed: Mar. 29, 2002

(65) Prior Publication Data

US 2003/0068035 A1 Apr. 10, 2003

Related U.S. Application Data (60) Provisional application No. 60/327,015, filed on Oct. 5, 2001.

(51) Int. Cl.[7] ............................. H04M 1/00; H04B 1/38
(52) U.S. Cl. ................................ 379/433.12; 455/575.4
(58) Field of Search ....................... 379/433.12, 433.01, 379/433.11; 455/575.4, 90.3; D14/114

(56) References Cited

U.S. PATENT DOCUMENTS

| | | | |
|---|---|---|---|
| 5,440,629 A | * | 8/1995 | Gray ..................... 379/433.12 |
| D379,265 S | * | 5/1997 | Wathen et al. ............. D14/114 |
| 5,907,615 A | * | 5/1999 | Kaschke ................ 379/433.12 |
| 5,946,395 A | * | 8/1999 | Petrella et al. ......... 379/433.01 |
| 5,956,625 A | | 9/1999 | Hansen et al. |
| 6,082,535 A | | 7/2000 | Mitchell |
| 6,273,252 B1 | | 8/2001 | Mitchell |
| 6,333,716 B1 | | 12/2001 | Pontoppidan |

* cited by examiner

*Primary Examiner*—Jack Chiang
(74) *Attorney, Agent, or Firm*—Antonelli, Terry, Stout & Kraus, LLP (57) ABSTRACT

An electronic device such as a mobile phone having user changeable composite covers formed by a two-shot process. The covers are removable and are adapted to slide onto and off the electronic device/mobile phone to thereby enclose the electronic device/mobile phone in a water-resistant/dustproof manner. The composite covers include resilient regions with buttons formed therein that cooperate with control elements in the electronic device/mobile phone. The composite covers are formed by a two-shot process that involves the use of a transparent material in a first shot to provide a hard cover having a number of openings there through. The second shot involves the use of the transparent hard cover as a core onto which an elastomeric layer is applied, so that some of the openings in the hard cover have buttons formed thereon, whereas other regions and openings in the cover are not covered.

12 Claims, 6 Drawing Sheets

USER CHANGEABLE ELECTRONIC DEVICE/MOBILE PHONE COVERS AND METHOD

CROSS REFERRENCE TO RELATED PATENT APPLICATIONS

This patent application claims the benefit of U.S. provisional patent application 60/327,015, filed Oct. 5, 2001.

FIELD OF THE INVENTION

The invention relates to water-resistant, user changeable, electronic device/mobile phone composite covers and method of molding the composite covers.

BACKGROUND OF THE INVENTION

Historically, users of electronic devices and more specifically mobile phones in outdoor environments have been at the mercy of inclement weather, which results in moisture invading the electronic workings of the device or the phone and causing the phone to malfunction.

Where phones are involved the phones may be dropped in puddles, snow or sand. In order to shield the phone from the elements it has been suggested in the U.S. Pat. No. 6,082,535 issued Jul. 4, 2000 to Burke H. Mitchell that a one-shot, single use, disposable, protective covering for the mobile phone be provided. The covering is comprised of a one-piece, elastically deformable bag with a single opening. The mobile phone is inserted in the bag through the opening and the bag is sealed. The bag is semi-transparent, and dimensioned such that the phone fits snugly into the bag in such a manner that the operating keys or buttons are recognizable through the walls of the bag. The flexible nature of the deformable bag is such that the operating keys or buttons may be manually acted upon through a wall of the bag. A significant disadvantage of this arrangement resides in the rather unremarkable external appearance of the bag containing a mobile phone. It should not surprise contemporary citizens of the world that the outward appearance of mobile phones in particular provides the user of the phone with a highly visible fashion statement. Small, attractively designed phone exteriors are, for some individuals, almost as important as the quality of the communications heard over the phone. Purchasers of mobile phones must live with the external appearance of the phone for the life of the phone or the length of an installment contract for the purchase of phone service. The lack of a fashion statement that most mobile phones present may mean little to the fashion conscious consumer who keeps the phone is a purse or pocket.

In today's fast paced world, mobile phone users want their phones to be with them and accessible at all times even when the user is involved in action activities such as hiking, jogging, mountain biking, golfing and sun bathing. In fact, the fewer outer garments the active mobile phone user wears, the more conspicuous is the indistinctive classic black or black/silver housing of the conventional mobile phone.

It is into this void of unfashionable mobile phones that the instant invention provides an elegantly simple and highly attractive mobile phone with changeable covers that are waterproof. The phones are not only water-resistant but also readily adaptable to a wide variety of uses external to the garments or the body of the user.

SUMMARY OF THE INVENTION

The electronic device having user changeable covers of the instant invention is comprised of an electronic device and a pair of composite, removable covers that are adapted to slide onto and off of the electronic device and thereby enclose the electronic device in a protective manner when the covers are fully slid onto the electronic device.

More specifically, the electronic device covers are adapted to be releasably latched to the electronic device when the covers are fully slid onto the electronic device. The composite covers are formed of a hard material and include regions thereof that are comprised of a flexible elastomeric material. The electronic device includes a plurality of control keys/elements that are hermetically sealed into the electronic device to thereby establish a water-resistant electronic device. When the covers are fully slid onto the electronic device, the flexible regions of the covers are juxtaposed to the electronic device control keys/elements and the releasable latch, thereby allowing the keys/elements to be activated when a force is applied to a flexible region adjacent a key/element or releasable latch. The instant invention also provides for actuation components that are formed into some of the flexible regions, providing waterproof actuation components that cooperate with controls housed in the body of the mobile phone. At least one region of the hard material is transparent and is adapted to create a window, thereby allowing an infrared signal to pass through the transparent window and communicate with the electronic device.

The invention further broadly embraces a method of providing an electronic device with a changeable, composite two-shot molded cover. The method involves forming a cover by injecting a first shot of material into a first cover mold. The mold is adapted to cooperate with the first shot material such that when the material hardens, openings are provided through the cover. This step is followed by placing the cover into a second cover mold and injecting a second shot of elastomeric material onto the hardened cover to form a composite cover and thereby establish flexible elastomeric regions over selected portions of the hardened cover. A resilient planar keypad is provided that includes raised keypads on an upper surface thereof and has corresponding protruding keypad elements on a reverse side thereof, which are adapted to pass through openings in the composite cover and cooperate with control elements in the electronic device. The changeable cover is further enhanced by providing a first shot material that is transparent and providing the second shot material that is translucent such that the cooperation of the first shot and second shot material in a selected portion of the cover creates a transparent window that allows a data-carrying signal to pass through the window into the electronic device for use therein. The changeable cover may additionally be enhanced by providing actuation components that are formed into some of the flexible regions, resulting in waterproof actuation components that cooperate with control elements in the body of the electronic device. A last step of the method involves sliding the cover over the electronic device to thereby juxtapose the flexible elastomeric regions over selected openings adjacent control elements in the electronic device, thereby providing an electronic device having a composite changeable cover.

A primary advantage/objective of this invention resides in the effortless utility brought about by providing an electronic device/mobile phone with changeable, composite covers that may include three dimensional design features that enhance the look of a user wearing the electronic device on their person.

The preferred embodiment of the invention is a mobile phone with changeable covers. The advantage/objectives now to be recited embrace a mobile phone body that has changeable covers. Accordingly another advantage/ objective of the invention is to provide a water-resistant/ dustproof mobile phone with changeable phone covers.

Yet another advantage/objective of the invention is to provide a mobile phone with changeable covers adapted to allow a mobile phone user manual access to control keys/ buttons on the mobile phone that are protected by the changeable covers.

Still yet another advantage/objective of the invention resides in the inclusion of such components as the volume key, power key and release buttons as integrated elements of a changeable cover.

An advantage/objective of the invention is to provide a mobile phone body with a pair of composite covers that, when slid onto the mobile phone body, are releasably locked into place on the phone body by means of release buttons formed in one of the covers.

An advantage/objective of the invention resides in the provision of a waterproof release button integrated into a cover, thereby avoiding the need for a separate release button part.

In the spirit of the just noted advantage/objective, the invention reduces the number of parts and assembly time needed for waterproofing and locking of the covers to a mobile phone body.

A further advantage/objective of the invention resides in the integration of multiple actuation components within a mobile phone cover, thereby obviating the need for separate actuation components and the attendant time required to assemble a cover having multiple actuation components.

An additional advantage/objective of the invention resides in the provision of a water-resistant mobile phone environment for a mobile phone, when a pair of composite, mobile covers is slid together, and matingly cooperates, to enclose a mobile phone body.

One more advantage/objective of the invention resides in the provision of composite covers for a mobile phone, wherein an outer surface of the covers is comprised of elastomeric material to enhance the shock resistant aspect of the mobile phone when the covers are locked in place on the mobile body.

A highly significant advantage/objective of the invention resides in the ease of a mobile phone user employing the invention to completely change overall external look/ appearance of the mobile phone by simply changing the color of an outer material of the composite cover.

BRIEF DESCRIPTION OF THE DRAWINGS

The present invention is further described in the detailed description which follows in reference to the noted plurality of drawings, by way of non-limiting examples of embodiments of the present invention, in which like reference numerals represent similar parts throughout the several views of the drawings, wherein.

DETAILED DESCRIPTION OF THE PREFERRED EMBODIMENT

Figure 1:
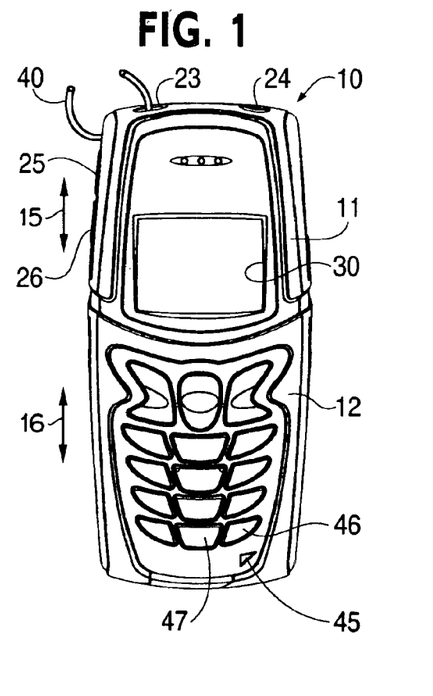
FIG. 1 is a front view of a mobile phone embodying the invention.
Figure 2:
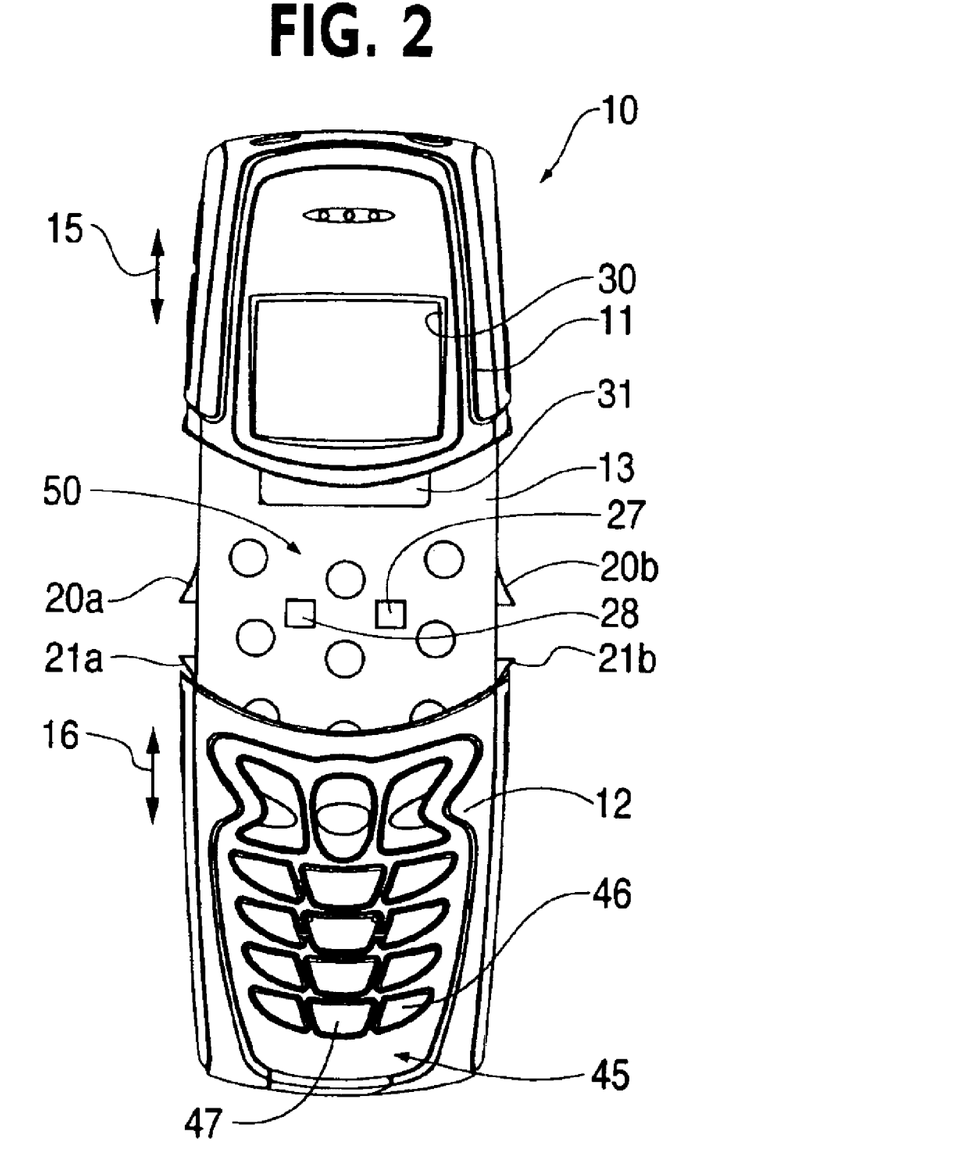
FIG. 2 is a front view of a mobile phone embodying the invention shown with covers partially moved.
Figure 11:
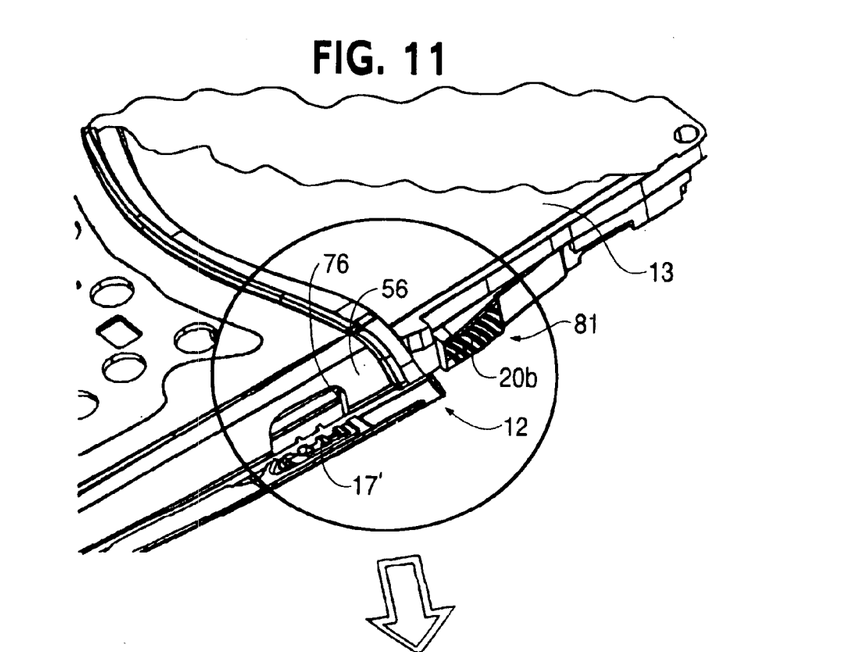
FIG. 11 is a perspective view of a release mechanism in a mobile phone that embodies the invention.
Figure 12:
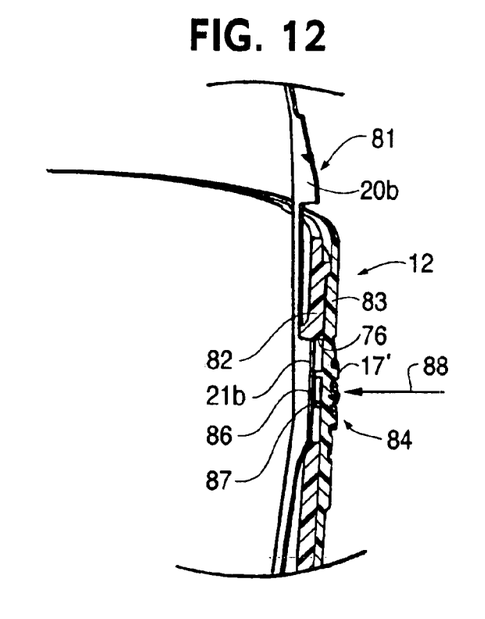
FIG. 12 is a partial section of an elastic release button housed in a second changeable cover and a locking spring arrangement.
Figure 13:
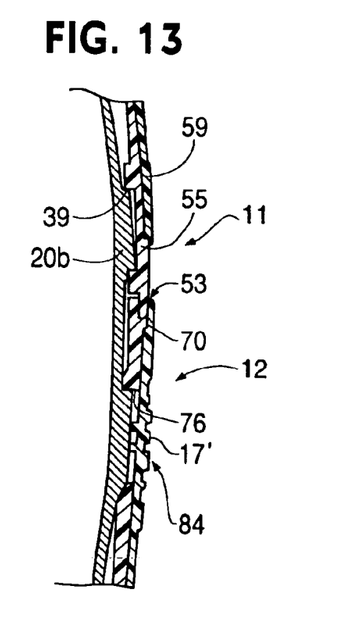
FIG. 13 is a partial section of a portion of the interaction of a first composite cover engaging a second composite cover, as well as the cooperation of a locking spring element.

Reference is now made to FIG. 1 that illustrates a front view of a preferred embodiment of an electronic device here depicted as a mobile phone 10. The balance of the specification is directed to a description of the preferred embodiment. In this regard it should be kept in mind that whenever the term mobile phone or mobile phone body is employed as descriptors these are intended to be embraced by the broader idea of an electronic device. The mobile phone 10 is provided with user changeable, composite covers 11, 12. FIG. 2 differs from FIG. 1 in that the mobile phone 10 is shown with changeable covers 11, 12 that are adapted to slide onto and off of a mobile phone body 13. Double-headed directional arrows 15, 16 indicate the sliding movement just described. The mobile phone body 13 also includes pairs of locking spring elements 20a, 20b, and 21a, 21b. The role and function of these locking spring elements will be described in more detail hereinafter, when FIGS. 11, 12 and 13 are explained. At this point in the description of the invention it is sufficient to note that the pairs of locking spring elements 20a, 20b and 21a, 21b cooperate with the covers 11, 12 to secure the covers to the mobile phone body 13, when the covers 11, 12 slide onto the mobile phone body 13.

The changeable, composite covers 11, 12 have been formed by a two-shot process to be described in detail hereinafter. Suffice it to say that each of the covers 11, 12 are comprised of hard and flexible, i.e. elastomeric, material. The elastomeric material is disposed on a hard cover in such a manner that the flexible elastomeric material covers select openings in the hard cover.

Figure 3:
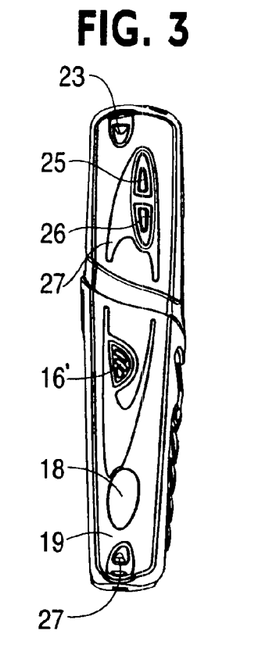
FIG. 3 is a left side view of FIG. 1.
Figure 4:
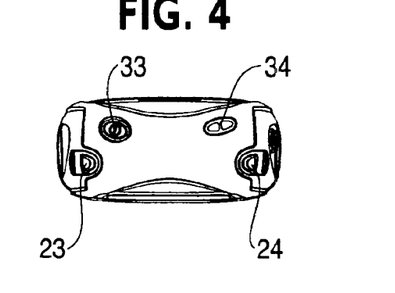
FIG. 4 is a top view of FIG. 1.
Figure 5:
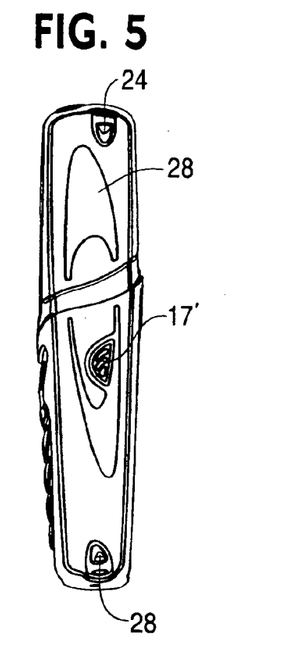
FIG. 5 is a right side view of FIG. 1.
Figure 6:
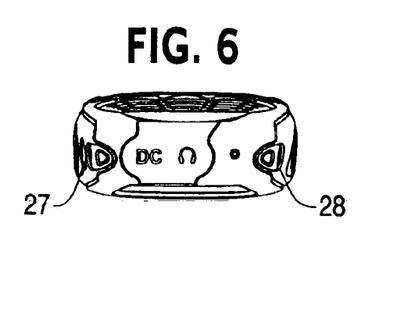
FIG. 6 is a bottom side view of FIG. 1.

Reference is now made to FIGS. 1, 3, 4, 5 and 6 which, when studied together in conjunction with the description that follows, will provide a full description of the invention as it is preferably embodied in a mobile phone having changeable covers. FIGS. 3 and 5 are side views of FIG. 1. In FIGS. 3 and 5 there are elastic release buttons 16', 17' that cooperate with locking spring elements 21a, 21b not shown in these figures, but noted as present in the description hereinbefore of FIG. 2. Although not apparent when FIG. 2 is studied, it is to be understood that the locking spring elements 20a, 20b and 21a, 21b are each of a unified structure such that physical pressure applied to elastic release buttons 16', 17' causes the locking spring elements to move toward the cell phone body 13, thereby allowing the changeable covers to be removed from the cell phone body. More will be said about the role and function of the locking spring elements hereinafter. It is sufficient to note that the locking spring elements may be adapted to allow both covers 11 and 12 to be released simultaneously or cover 11 to be released first and then cover 12.

Because the drawings, FIGS. 1, 3, 4, 5, and 6, are line drawings it is difficult to discern upon a visual examination what portions of the covers 11, 12 are exposed, hard material and what regions are hard regions of the cover that have an elastomeric covering. To assist in the development of an appreciation of the external physical nature of each of the changeable covers 11 and 12, let us first examine cover 11, as shown in FIGS. 3 and 5. FIG. 3 shows a layer of elastomeric, flexible material molded to form buttons 25, 26, which are juxtaposed to control elements (not shown) in the mobile phone body 13. The buttons 25, 26 in this embodiment of the invention are intended to control the audio volume of a transceiver (not shown) in the cell phone body 13. In FIGS. 3 and 5 there are decorative, formed regions 27, 28 in the elastomeric material that covers the hard material of the cover 11, previously described. A window 30 is provided in the cover 11. This window 30 provides visual access to an alphanumeric display 31, FIG. 2 in the mobile phone body 13.

In FIG. 4 a power button 33 for the mobile phone and buzzer opening 34 are shown schematically. Note also corner cover openings 23 and 24 are adapted to accommodate a flexible line, such as flexible line 40, FIG. 1, shown passing through corner cover opening 23. It should also be noted that the changeable cover 12 includes corner cover openings 27, (FIG. 3) and 28 (FIG. 5). The cooperation of a flexible line, such as line 40, with one or more of the corner openings 23, 24, and 27, 28, is another novel feature of the instant invention. The role and function of a flexible line and corner openings in a mobile phone are fully described in co-pending U.S. patent application Ser. No. 09/970,777, titled Mobile Phone Strap Holder Apparatus and Method, filed on Oct. 5, 2001, which is assigned to a common assignee. In this application it is enough to state that the flexible line 40 and the corner openings 23, 24, 27, 28 are adapted to allow the removable covers, when in place, to be secured to an object (not shown), by means of the flexible line passing through the openings and around the object, whereupon ends of the line may be secured to each other.

Returning now to FIG. 1 the removable composite cover 12 is created by a two-shot process of the same nature as that described with respect to removable cover 11. A better appreciation of the manner in which the inventive two-shot process of the subject invention evolves from a first shot that produces a cover will now be undertaken. The composite cover 12 is comprised of transparent material, with regions thereof having selected openings, some of which are covered with elastomeric material in a second shot process that will be completely explained when subsequent FIGS. 7 through 10 are described hereinafter.

Figure 9:
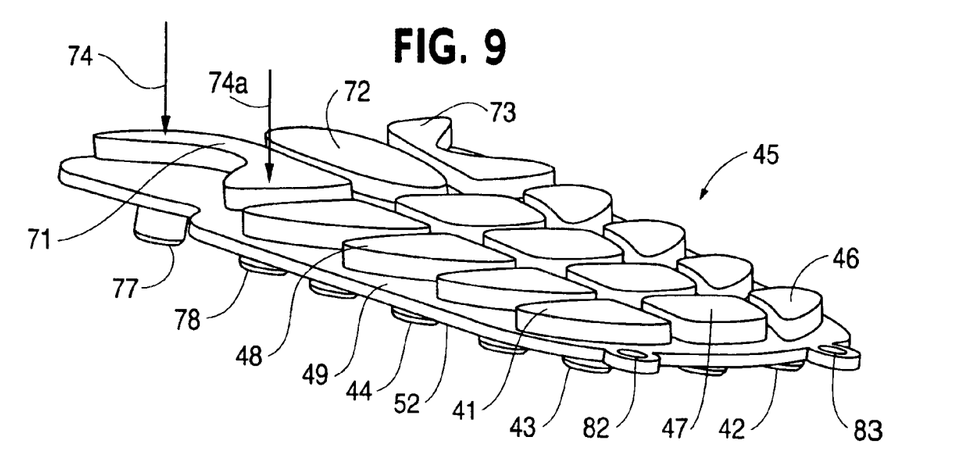
FIG. 9 is a perspective view of a resilient planar keypad that is intended to cooperate with the second cover that has been formed by a two-shot process.
Figure 10:
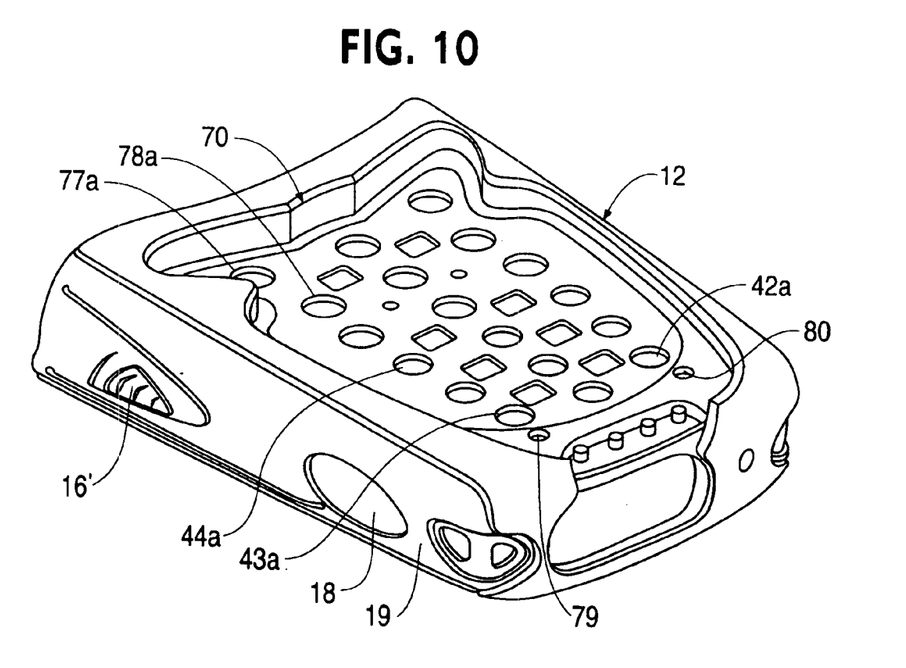
FIG. 10 is a perspective view of a second composite cover that has been formed by a two-shot process.

A resilient planar keypad 45, FIG. 1, shown separately in FIG. 9, is provided with raised keypads, two of which 46, 47 are referenced. The keypad 45 may be formed by injection molding of a resilient silicon material which is translucent. The keypad 45 can also be compress molded. In FIG. 9 there is a perspective view of the keypad 45 shown in isolation from the cover 12. In FIG. 2 the mobile phone body 13 is partially revealed, (as the changeable covers 11, 12 are shown partially removed), showing an array of mobile phone control elements 50 which will be juxtaposed to the keypads of the resilient planar keypad 45, when the changeable cover 12 slides upwardly to cover the array of mobile phone control elements 50. The array of control elements 50 is hermetically sealed in the mobile phone body 13. A detailed explanation and description of the planar keypad 45 and its cooperation with the cover 12 and array of mobile phone control elements 50, here shown as being circular in shape, will follow. This cooperation will be described hereinafter when FIGS. 9 and 10 are described and explained. The rectangular features 27, 28 are light emitting diodes (LEDS) that are intended to illuminate the translucent keypad 45.

Attention is now directed to FIG. 3 and more particularly to a transparent window 18 that is created by the cooperation of transparent material employed in the forming of the composite cover 12 in the two-shot process, which will be described in detail in connection with an explanation of FIGS. 13 to 18. Without going into details of the two-shot process at this point in the description of the invention, it is to be noted that the cover 12 is provided with an elastomeric material 19 that has been formed on the transparent material of the cover 12. The presence of the window 18 in the cover 12 allows an infrared signal to pass through the transparent window and communicate with an electronic device in the mobile phone.

Figure 7:
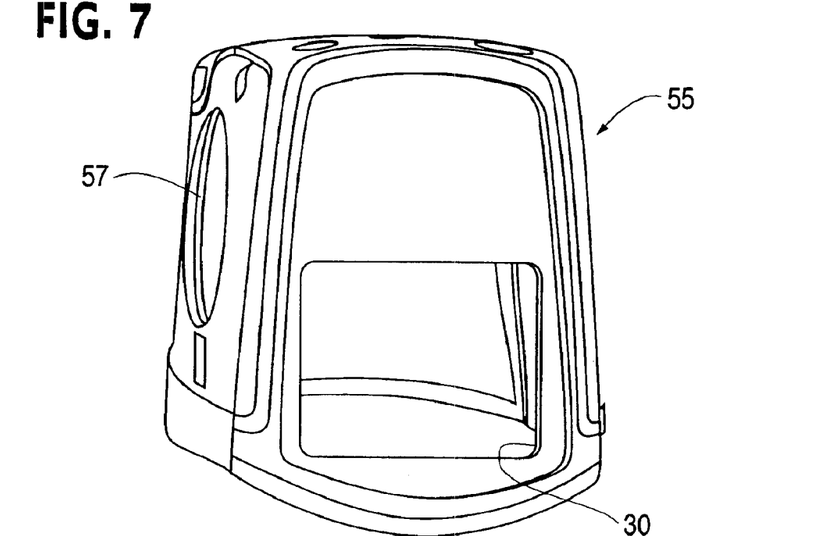
FIG. 7 is a perspective view of a first cover formed by a first shot of a two-shot process.
Figure 8:
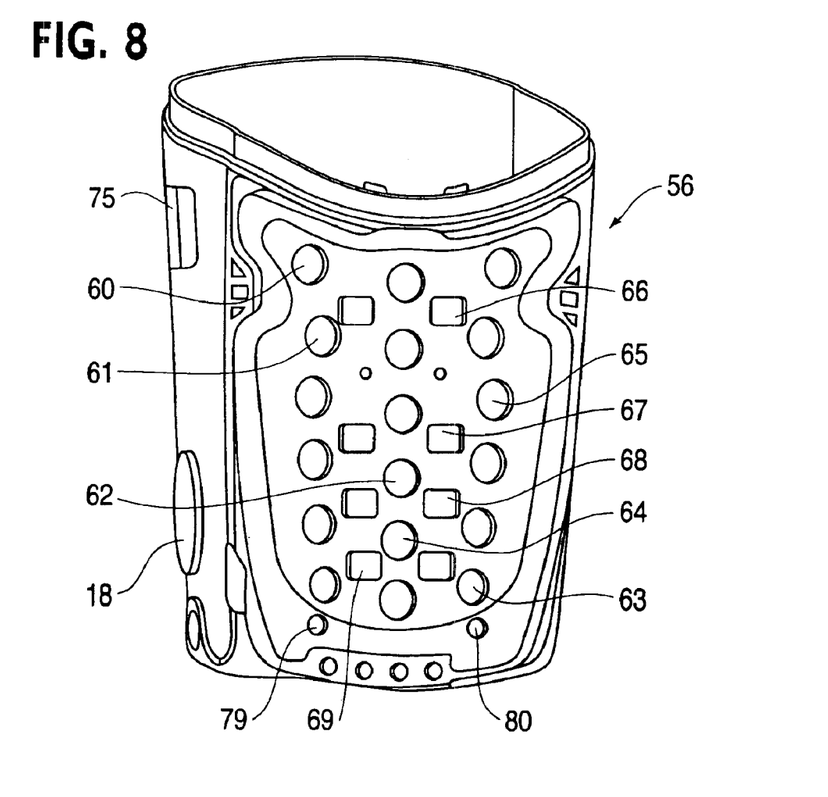
FIG. 8 is a perspective view of a second cover formed by a first shot of a two-shot process.

Reference is now made to FIGS. 7 and 8, which illustrate first components 55, 56 of composite covers 11, 12. The first components 55, 56 are comprised of hard transparent material. These components 55, 56 have been formed by a first shot injection molding process that involves an injection mold (not shown) into which a measured amount of resin material is introduced from an exterior heating cylinder (not shown). Upon cooling, the resin material forms the transparent first and second components 55, 56.

In FIG. 7 the transparent hard first component 55 includes the window 30 noted earlier. Although not shown clearly in FIG. 1, a detached pane of transparent material is fixed to the cover 55 behind the window opening 30 with an adhesive tape, so as to cover the window 30 before the composite cover 11 is slid onto the mobile phone body 13. An opening 57 in the first transparent hard component 55 provides access to audio volume controls in the mobile phone body 13, when the composite cover 11, which includes the transparent hard component 55, is in place on the mobile phone body 13 in a manner to be described hereinafter. The volume control buttons 25, 26 in FIG. 3 are formed as part of a second shot of the two-shot process and cooperate with the opening 57 and the audio volume controls just noted.

Turning now to FIG. 8 and the transparent hard cover component 56, it will be noted that there are an array of 18 circular openings, six of which are identified with reference numerals 60, 61, 62, 63, 64, 65. An array of rectangular shaped depressions is present in the transparent cover 56, four of which are identified by reference numerals 66, 67, 68, 69. These rectangular depressions result in a thinning of the transparent cover 56. These thin, transparent depressions allow light emitted from light emitting diodes (LEDS), such as LEDS 27, 28 in the cell phone body 13 (see FIG. 2), to pass through and illuminate individual translucent keypads such as keypads 46, 47 in the keypad 45. An infrared window region 18 is also visible in the transparent hard cover component 56.

Note the presence of a release button opening 75 in the transparent component 56. Although not visible in the perspective view of FIG. 8, it should be understood that there is another release button opening 76 which can be discerned upon a study of the cross-sectional illustrations in FIGS. 11 and 12. Guideposts 79, 80, integrally formed in transparent component 56, cooperate with openings 82, 83 (FIG. 9) in resilient planar keypad 45, when the keypad is put in place over the composite cover 12 (FIG. 2), as will be described later. In this regard, a study of FIGS. 9 and 10, when taken together, will provide a better appreciation of the mating relationship of the keypad 45 to the composite cover 12.

Attention is now directed to FIGS. 9 and 10. FIG. 10 depicts a fully formed composite cover 12 produced by the aforementioned two-shot process. Missing from the composite cover of FIG. 12 is the resilient planar keypad 45, illustrated in FIG. 9 and shown in place in FIGS. 1, 2. Readily visible in the perspective view of FIG. 10 is elastic release button 16, which has been formed in the second shot of the two-shot process. The elastic release button 16 is formed over the opening 75 (FIG. 8) of the first hard cover 56 of composite cover 12. Note also that the transparent window 18 is shown with elastomeric material 19 surrounding the window 18. Reference arrow 70 is shown just touching the elastomeric material covering most of the outside of the composite cover 12.

In FIG. 9 the resilient planar keypad 45 is shown in a perspective view, so as to reveal the raised keypads, such as 46, 47 and 48, integrally disposed on an upper surface 49. Note that keypad 49 includes protruding keypad elements such as 42, 43 and 44 on a reverse surface 52 of the upper surface 49 of the resilient planar keypad 45. The protruding keypad elements are intended to pass through circular openings in composite cover 12. For example, protruding keypad element 42 would pass through opening 42a, whereas protruding keypad elements 43, 44 would pass through openings 43a, 44a. Although not visible in these figures, it is to be understood that the protruding keypad elements are juxtaposed to control elements in the mobile phone body 13 (see FIG. 2).

Attention is now directed to dual function keypads 71, 72, 73, which have hard plastic key tops. The keypads with hard plastic tops are glued onto the upper surface 49 of the resilient planar keypad 45. The dual function operation, for example of hard plastic key top keypad 71, arises when it is appreciated that the keypad 71 spans protruding keypad elements 77, 78 which pass through openings 77a, 78a in the composite cover 12 of FIG. 10. Accordingly a downward force applied directly to keypad 71, as indicated by arrow 74, will direct the force via the protuberance 77, which passes through opening 77a to a control element 53 (FIG. 2), to actuate the control element 53 in the mobile phone body 13. In a similar manner when a force 74a is applied, as shown, to the keypad 71, a second function is initiated in the mobile phone as the downward force 74a is transmitted via protuberance 78 to control element 54 in the mobile phone body 13.

Turning now to FIGS. 11 and 12, FIG. 11 depicts a partial section of an elastic release button 17 of composite cover 12 and related locking spring structure 81, now to be described. FIG. 12 is a partial section of an elastic release button 17 housed in the cover 12. As will be recalled, the composite cover 12 is comprised of a hard, transparent material 82, formed in the first shot process previously noted. An elastomeric material 83 has been formed on the hard material 82 to form the composite cover 12. A release button opening 76 is shown with the elastomeric material 83 covering the opening 76.

Turning now to FIG. 11, which is a cross-section that reveals the manner in which the mobile phone body 13 and composite covers 12 cooperate with a locking spring 81. In FIG. 11 the cover 12 is sectioned in a manner that allows the viewer to see the release button opening 76 in the hard cover material of the first component 56. Note also that elastic release button 17, first described with respect to FIG. 5, is shown revealed in perspective in FIG. 11. A locking spring 81 and locking spring element 20b are also clearly shown.

The cooperation of the locking spring 81, release button 17, and composite cover 12, comprised of the hard material 82 of the cover 56, will be appreciated when FIG. 12 is now described. The locking spring 81 has an elongated configuration that includes locking spring element 20b, which cooperates with the composite cover 11, as depicted in FIG. 13. The locking spring element 20b is adapted to engage a side of the release button opening 39, as is shown in FIG. 13. The locking spring 81 can be a separate part or integrated into the mobile phone body. The locking spring may be made of metal or plastic. The details of the manner in which the locking spring is secured to the mobile phone body do not form a part of the instant invention and are therefore not shown. The releasable button 17, here shown in section in FIGS. 11, 12, 13, includes an outer multiple ribbed section 84 formed in the elastomeric material 83 and a pair of molded fingers 86, 87, here shown in surface contact with locking spring element 21b. An arrow 88 is intended to represent a force applied against the elastic release button 17. This just described force acts upon the elastic release button 17 via molded fingers 86, 87 to cause locking spring element 21b to be displaced to the left, which allows the locking spring element 21b to become free from an edge of the release button opening 76. This results in the release of the mobile phone body from the composite cover 12.

FIG. 13 differs from FIG. 12 in that the cross-section also includes a portion of composite cover 11, as indicated by mating engagement 53, with composite cover 12. The mating engagement 53 establishes a water-resistant/dustproof joint between the composite covers 11 and 12. The composite cover 11 includes, as noted earlier, a first hard component 55, formed in a first shot of a two-shot process and an elastomeric layer 59, formed on the hard component 55 in the second shot of the two-shot process.

From the foregoing description it follows that, in the broadest sense, the instant invention is embodied in a mobile phone having user changeable mobile phone covers that include a mobile phone body and a pair of removable covers that are adapted to slide onto and off of the mobile phone body and thereby enclose the mobile phone body in a protective manner, when the covers are fully slid onto the mobile phone body. At least one of the covers is adapted to be releasably latched to the mobile phone body, when the cover is fully slid onto the mobile phone body. The practice of the invention further provides that, where a pair of mobile phone covers is employed, the covers are adapted to be releasably latched to the mobile phone body, when the covers are fully slid onto the mobile phone body. An especially significant feature of the removable covers resides in their composite construction, wherein each of the composite covers is formed, in part, of hard material and includes regions thereof that are comprised of a flexible material. In a preferred embodiment of the invention at least one of the composite covers has at least one hard region of the removable cover that is formed of transparent material and is adapted to create a window, thereby allowing an infrared signal to pass through the transparent window and communicate with an electronic device in the mobile phone.

The mobile phone body is of the type that includes a plurality of control elements that are hermetically sealed into the mobile phone body to establish a water-resistant mobile phone body. In order that the mobile phone covers cooperate with the control elements of the mobile phone, the covers include openings juxtaposed to the control elements, when the covers are fully slid onto the mobile phone body. One of the covers includes, in combination therewith, a resilient planar keypad provided with raised keypads on an upper surface thereof and corresponding protruding keypad elements on a reverse surface thereof. These protruding elements are adapted to pass through openings in the cover and cooperate with the juxtaposed control elements in the mobile phone body.

Another unique feature of the invention resides in the provision of flexible regions of elastic material that span openings in the hard material of the composite cover. At least one flexible region of these just noted flexible regions is juxtaposed to at least one releasable latch that is adapted to cooperate with the cell phone body and one of the removable covers, thereby allowing the latch to be activated when a force is applied to a flexible region adjacent the releasable latch.

There is yet another incomparable structural feature of the invention in its preferred embodiment and this inventive feature resides in the provision of actuation components that are physically formed in some of the flexible regions of a cover to thereby provide external actuation components that cooperate with control elements housed in the body of the mobile phone. An ancillary but vital feature of the invention is the provision of a window in one of the covers, through which an alphanumeric screen of the mobile phone may be viewed when the cover is slid fully onto the mobile phone body.

The utility of the instant invention, as presented in the preferred embodiment of the invention, is greatly enhanced by the inclusion of two openings, remote from each other, in each cover. A flexible line may be employed that passes through one or more of the openings and around an object, whereupon ends of the line may be secured to each other. This just described feature advantageously allows a mobile phone that includes the invention to be secured to various parts of the mobile phone user's anatomy or clothing.

Reference is now made to FIGS. 13 through 18, which illustrate the preferred steps for a two-shot injection molding process that embodies the invention. In view of the internal and external complex nature of the composite covers 11 and 12, the two-shot process now to be described is intended to be illustrative only, in the sense that the drawings and a composite element brought into existence by the two-shot process will only be exemplary of the process employed to produce the actual composite covers 11 and 12.

Figure 14:
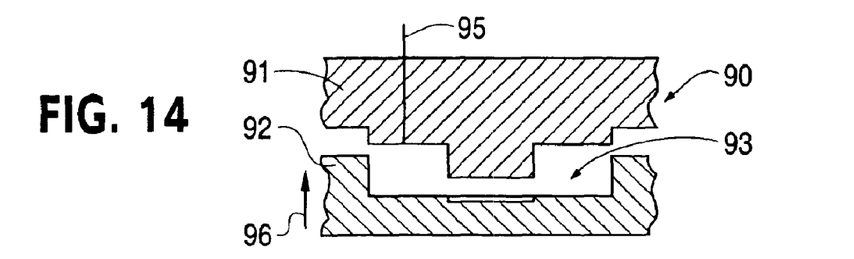
FIGS. 14, 15, and 16 illustrate the steps involved in a first shot of a two-shot molding process involved in forming a first hard resin component.
Figure 15:
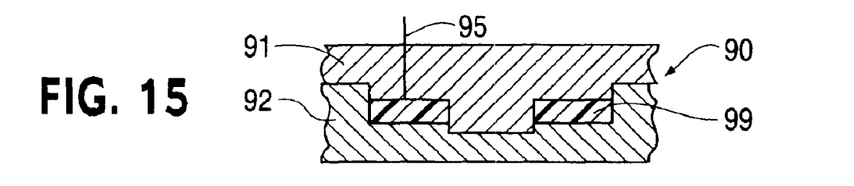
Figure 16:
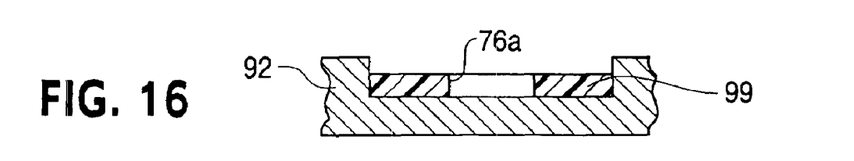

Turning now to FIG. 14, a first injection mold 90 is comprised of spaced apart first and second first injection mold parts 91, 92, which establish a first mold cavity 93 between the mold parts 91, 92. The first mold part 91 includes a schematically shown injection inlet 95. An upwardly directed arrow 96 adjacent the second mold part 92 indicates the direction of movement; the second mold part 92 travels to bring the mold parts 91, 92 together to form the first mold cavity 93. A first shot of resin is shown delivered via the injection inlet 95 into the mold cavity 93, which fills the cavity with resin, which, when solidified, forms a hard resin component 99. A suitable resin for use in the practice of this step of the invention is Grilamid TR55LX. FIG. 16 shows the second mold part 92 with the first mold part 91 removed. A hard resin component 99, having an opening 76a formed by the first shot process, is shown ready for removal and use in a second shot molding process now to be described.

Figure 17:
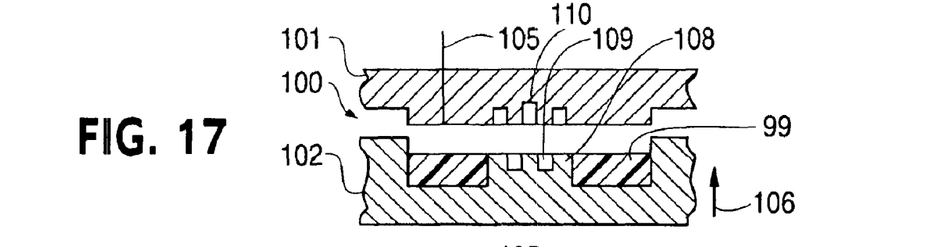
FIGS. 17 and 18 illustrate the steps involved in a second shot of a two-shot molding process, which results in a composite component comprised of a hard resin, upon which an elastomeric layer has been formed.

FIG. 17 depicts a second injection mold 100 comprised of spaced apart first and second injection mold parts 101, 102. The injection mold part 101 includes a schematically shown injection inlet 105. An upwardly directed arrow 106 shown to the right of and adjacent to mold part 102 indicates the direction of movement the mold part 102 travels.

Figure 18:
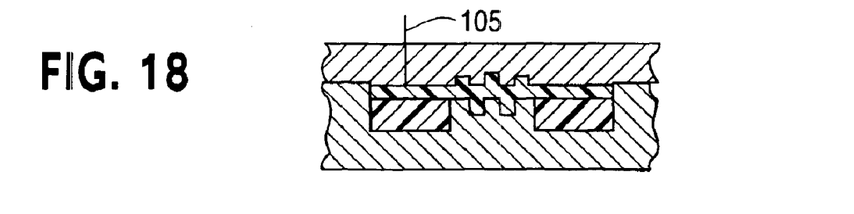

The second mold part 102 is shown with the hard resin component 99 placed into second injection mold part 102. Note that the second mold part 102 includes a raised central region 108 that fits within the opening 76a of the hard resin component 99. When the hard resin component 99 is positioned as shown in FIGS. 17 and 18, it functions as a core onto which an elastomeric material of a second shot may be formed. The second mold part 101 is provided with grooves, one of which, 109, is referenced. In a similar manner, second mold part 101 includes a plurality of grooves, one of which, 110, is referenced.

Figure 19:
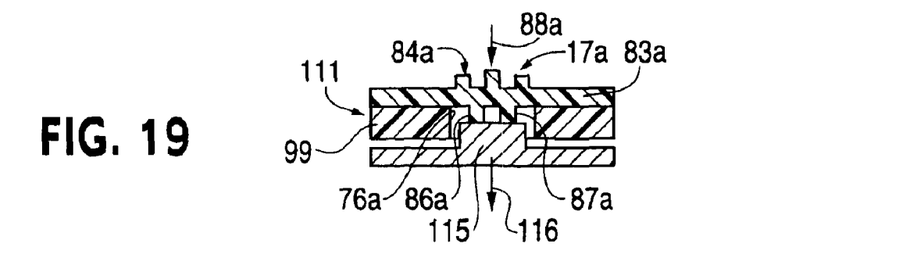
FIG. 19 depicts a composite component produced by the two-shot process illustrated in FIGS. 14 through 18.

FIG. 18 depicts the second mold parts 101, 102 in mating engagement after an elastomeric material has been injected into the second injection mold 100 via the injection inlet 105. A suitable elastomeric material for use in the practice of the invention is identified as Estane GP75AE. FIG. 19 shows a resultant composite element 111 comprised of a hard material 99 having an opening 76a covered by a resilient elastomeric material 83a. The flexible elastomeric material 83a includes a multiple ribbed section 84a on an upper side of the elastomeric material 83a, whereas on an under side thereof there are molded fingers 86a, 87a. A release latch button 115 is shown positioned within the opening 76a.

Attention is now directed back to the illustrations of FIGS. 12 and 13 where the elastic release button 17 is shown cooperating with a locking spring element 21b that is positioned in the release button opening 76. It should be readily apparent that the two-shot process just described with respects to FIGS. 14 through 18, creates a release button arrangement 17a, FIG. 19 of the similar nature to that shown in these just noted figures. The arrow 88a represents a force applied, as shown, which causes the release latch button 115 to move in the direction of the arrow 116.

By way of summary the inventive method, in its broadest sense, involves providing a mobile phone with a changeable two-shot composite molded cover. The method includes the following steps:

(a) providing a mobile phone body that has actuatable control elements, (b) forming a cover by injecting a first shot of material into a first cover mold, the cover mold being adapted to cooperate with the first shot material such that when the material hardens, openings are provided through the cover, (c) placing the cover into a second cover mold and injecting a second shot of elastomeric material onto the hardened cover, thereby establishing flexible elastomeric regions over selected portions of the hardened cover as well as over selected openings in the cover, thereby providing a flexible elastomeric region over the selected openings, and (d) sliding the cover over the mobile phone body, thereby providing a mobile phone having a changeable cover.

The inventive method additionally involves providing a resilient planar keypad that includes raised keypads on an upper surface thereof and has corresponding protruding keypad elements on a reverse side thereof adapted to pass through openings in the cover and to cooperate with control elements in the mobile phone body.

Of particular importance to the inventive method is the provision of a first shot material that is transparent and a second shot material that is translucent, such that the cooperation of the first shot and second shot materials, in a selected portion of the cover, establishes a transparent window in the cover, thereby allowing a data-carrying signal to pass through the transparent window and into the mobile phone body for use therein, when the cover is slid onto the mobile phone body.

Of significant value to the inventive method of providing a mobile phone with a changeable cover is the provision of actuation components that are present in some of the flexible regions, thereby providing inherently waterproof actuation components in the cover that cooperate with control elements in the body of the mobile phone.

It should be readily apparent that a mobile phone may be provided with a pair of covers, each of which is a by-product of the two-shot method that embodies the inventive method as previously described.

The invention further contemplates as falling within the purview of its claims a two-shot process where a first and second cover are simultaneously formed and then subjected to a second shot process, where the first and second covers are employed as a core for the second shot process to create first and second composite covers, followed by securing a keypad to one of the composite covers, followed by sliding the covers over a mobile phone body having actuable control elements.

Although the present invention has been described herein with reference to a particular method, materials and embodiments, the present invention is not intended to be limited to the particulars disclosed herein. Rather, the present invention extends to all functionally equivalent structures, methods and uses, such as are within the scope of the appended claims.

What is claimed is:

1. An electronic device including user changeable covers comprising:

a body including a plurality of control elements including a plurality of keypad elements:

a pair of removable covers that are adapted to slide onto and off of the electronic device to enclose the electronic device in a protective manner, when the covers are fully slid onto the body of the electronic device; and wherein the covers are slid off of the body of the electronic device to detach the covers completely from the electronic device to provide for user change of the covers and at least one of the covers contains at least one opening through which at least one of the keypad elements projects when the covers are slid onto the device.

2. The electronic device of claim 1, wherein at least one of the covers is adapted to be releasably latched to the electronic device, when the cover is fully slid onto the electronic device.

3. The electronic device of claim 1, wherein both of the covers are adapted to be releasably latched to the electronic device, when the covers are fully slid onto the electronic device.

4. The electronic device of claim 1 wherein the removable covers are formed in part of hard material and include regions thereof that are comprised of a flexible material.

5. The electronic device of claim 4, wherein at least one hard region of the removable cover is formed of a transparent material and adapted to create a window, thereby allowing an infrared signal to pass through the transparent window and communicate with the electronic device.

6. The electronic device of claim 4, wherein the plurality of control elements are hermetically sealed into the electronic device to establish a water-resistant electronic device.

7. The electronic device of claim 6, wherein one of the electronic device covers includes in combination therewith a resilient planar keypad provided with raised keypads on an upper surface thereof and corresponding protruding keypad elements on a reverse surface thereof adapted to pass through the openings in the cover and cooperate with the juxtaposed control elements of the electronic device.

8. The electronic device of claim 4, wherein flexible regions of the removable covers are juxtaposed to at least one releasable latch adapted to cooperate with the electronic device and at least one of the removable covers, thereby allowing the latch to be activated when a force is applied to a flexible region adjacent the releasable latch.

9. The electronic device of claim 4, wherein actuation components are provided that are physically formed in some flexible regions of a cover, thereby providing actuation components that cooperate with control elements housed in the body of the mobile phone.

10. The electronic device of claim 9, wherein one of the covers includes a window through which an alphanumeric screen of the electronic device may be viewed, when the cover is slid fully onto the electronic device.

11. The electronic device of claim 1, wherein each of the covers includes at least one opening through which a flexible line may be secured, thereby allowing the electronic device, with its removable covers in place, to be secured to an object by means of the flexible line passing through the openings and then around an object, whereupon ends of line may be secured to each other.

12. The electronic device of claim 1, wherein each of the covers includes two openings, remote from each other, through which a flexible line may be secured, thereby allowing the electronic device, with its removable covers in place, to be secured to an object by means of the flexible line passing through the openings and then around an object, whereupon ends of line may be secured to each other.

* * * * *